US010705745B2

(12) United States Patent
Awad et al.

(10) Patent No.: US 10,705,745 B2
(45) Date of Patent: Jul. 7, 2020

(54) USING A MEMORY CONTROLLER TO MANGE ACCESS TO A MEMORY BASED ON A MEMORY INITIALIZATION STATE INDICATOR

(71) Applicant: Hewlett Packard Enterprise Development LP, Houston, TX (US)

(72) Inventors: Amro J. Awad, Princeton, NJ (US); Pratyusa K. Manadhata, Piscataway, NJ (US); William G. Horne, Lawrenceville, NJ (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 55 days.

(21) Appl. No.: 15/573,582

(22) PCT Filed: Sep. 30, 2015

(86) PCT No.: PCT/US2015/053308
§ 371 (c)(1),
(2) Date: Nov. 13, 2017

(87) PCT Pub. No.: WO2017/058218
PCT Pub. Date: Apr. 6, 2017

(65) Prior Publication Data
US 2018/0121122 A1 May 3, 2018

(51) Int. Cl.
*G06F 3/06* (2006.01)
*G06F 13/16* (2006.01)
*G06F 12/02* (2006.01)

(52) U.S. Cl.
CPC .......... *G06F 3/0632* (2013.01); *G06F 3/0611* (2013.01); *G06F 3/0652* (2013.01);
(Continued)

(58) Field of Classification Search
CPC .............. G06F 3/00; G06F 3/06–0689; G06F 5/00–16; G06F 9/00–548;
(Continued)

(56) References Cited

U.S. PATENT DOCUMENTS 6,160,739 A    12/2000   Wong
7,472,219 B2*  12/2008   Tamura ................. G06F 3/0611
                                                      711/103
(Continued)

FOREIGN PATENT DOCUMENTS

CN    101169760 A    4/2008
CN    103080911 A    5/2013
(Continued)

OTHER PUBLICATIONS

Machine translation of JPH05324453A; retrieved from https://patents.google.com/patent/JPH05324453A/en on May 8, 2019 (Year: 2019).*

(Continued)

*Primary Examiner* — Daniel C. Chappell
(74) *Attorney, Agent, or Firm* — Hewlett Packard Enterprise Patent Department

(57) ABSTRACT

A technique includes receiving, in a memory controller, a request to read data that is stored in the region of memory. The technique includes using the memory controller to manage access to the memory based on an initialization state indicator for the region of memory. Managing the access includes determining whether the region of memory is associated with the initialized state based on the indicator; and based at least in part on the determination, selectively bypassing accessing the memory and using the memory controller to provide data having a provide a predetermined data pattern.

17 Claims, 5 Drawing Sheets

(52) U.S. Cl.
CPC .......... *G06F 3/0659* (2013.01); *G06F 3/0679* (2013.01); *G06F 12/0246* (2013.01); *G06F 13/16* (2013.01); *G06F 13/1668* (2013.01); *G06F 2212/1024* (2013.01); *G06F 2212/7201* (2013.01); *G06F 2212/7203* (2013.01)

(58) Field of Classification Search
CPC ..... G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153

See application file for complete search history.

(56) References Cited

U.S. PATENT DOCUMENTS

| | | | | |
|---|---|---|---|---|
| 7,529,880 | B2* | 5/2009 | Chung | G06F 12/0246 711/103 |
| 7,646,636 | B2 | 1/2010 | Kim | |
| 7,653,796 | B2* | 1/2010 | Inoue | G06F 3/0607 711/111 |
| 7,694,119 | B1* | 4/2010 | Scharland | G06F 3/0607 713/1 |
| 7,774,525 | B2* | 8/2010 | Farhan | G06F 3/0611 710/10 |
| 8,099,544 | B2* | 1/2012 | Kurashige | G06F 12/0246 365/185.33 |
| 8,112,573 | B2* | 2/2012 | Keays | G06F 12/0246 365/185.29 |
| 2002/0095487 | A1 | 7/2002 | Day et al. | |
| 2002/0149986 | A1 | 10/2002 | Wong | |
| 2009/0187717 | A1* | 7/2009 | Nasu | G06F 12/0802 711/141 |
| 2009/0249015 | A1* | 10/2009 | Tzeng | G06F 12/0866 711/165 |
| 2010/0077131 | A1 | 3/2010 | Lam | |
| 2011/0173373 | A1 | 7/2011 | Scouller et al. | |
| 2012/0179862 | A1 | 7/2012 | Norman | |
| 2012/0265925 | A1 | 10/2012 | Miura | |
| 2012/0284587 | A1* | 11/2012 | Yu | G06F 3/0608 714/773 |
| 2013/0145085 | A1* | 6/2013 | Yu | G06F 12/0246 711/103 |
| 2015/0186072 | A1 | 7/2015 | Darragh et al. | |
| 2016/0070474 | A1* | 3/2016 | Yu | G06F 3/0608 711/103 |

FOREIGN PATENT DOCUMENTS

| | | |
|---|---|---|
| CN | 104298616 A | 1/2015 |
| JP | H05324453 A * | 12/1993 |
| WO | WO-2012016783 | 2/2012 |

OTHER PUBLICATIONS

Malloc(3)—Linux man page; die.net; Sep. 1, 2010; retrieved from https://web.archive.org/web/20100901171130/https://linux.die.net/man/3/malloc on Mar. 4, 2020 (Year: 2010).*

Free(3)—Linux man page; die.net; Jul. 15, 2010; retrieved from https://web.archive.org/web/20100715163433/https://linux.die.net/man/3/free on Mar. 4, 2020 (Year: 2010).*

Comprehensively and efficiently protecting the heap; Kharbutli et al.; ASPLOS XII: Proceedings of the 12th international conference on Architectural support for programming languages and operating systems, pp. 207-218; Oct. 2006 (Year: 2006).*

The dynamics of changing dynamic memory allocation in a large-scale C++ application; Harrison et al.; OOPSLA '06: Companion to the 21st ACM SIGPLAN symposium on Object-oriented programming systems, languages, and applications, pp. 866-873; Oct. 2006 (Year: 2006).*

Hu, J., et al., Write Activity Reduction on Non-Volatile Main Memories for Embedded Chip Multiprocessors, 2013, Transactions on Embedded Computing Systems, 12(3), pp. 77.

Li, J., et al., A Content-aware Writing Mechanism for Reducing Energy on Non-volatile Memory Based Embedded Storage Systems, Oct. 19, 2014, Design Automation for Embedded Systems, 1 page.

Extended European Search Report, EP Application No. 15905600.1, dated Mar. 19, 2018, pp. 1-12, EPO.

Amit Singh. "Mac OS X Internals: A Systems Approach", Addison-Wesley Professional, 2006, 1154 pages.

Bhandari et al., "Implications of cpu caching on byte-addressable non-volatile memory programming", Technical report, 2012, 7 pages.

Binkert et al., "The gem5 simulator", SIGARCH Comput. Archit. News, vol. 39, No. 2, pp. 1-7, Aug. 2011, ISSN 0163-5964. doi: 10.1145/2024716.2024718. URL http://doi.acm.org/10.1145/2024716.2024718.

Bovet et al., "Understanding the Linux Kernel", Oreilly & Associates Inc, 2005, 463 pages.

Calhoun et al., "Optimizing Kernel Block Memory Operations", 2006, 8 pages.

Chakrabarti et al., "Atlas: Leveraging locks for non-volatile memory consistency", In Proceedings of the 2014 ACM International Conference on Object Oriented Programming Systems Languages & Applications, pp. 433-452, ACM, 2014.

Chhabra et al., i-nvmm: A secure non-volatile main memory system with incremental encryption. In Proceedings of the 38th Annual International Symposium on Computer Architecture, ISCA '11, pp. 177-188.

Chow et al., "Shredding your garbage: Reducing data lifetime through secure deallocation", In Proceedings of the 14th Conference on USENIX Security Symposium—vol. 14, SSYM'05, 2005, pp. 331-346.

Gonzalez et al., "Powergraph: Distributed graph-parallel computation on natural graphs", In Proceedings of the 10th USENIX Conference on Operating Systems Design and Implementation, OSDI'12, pp. 17-30.

HP Labs, "The machine: A new kind of computer", available online at <https://web.archive.org/web/20150108051127/http://www.hpl.hp.com/research/systems-research/themachine/>, Jan. 8, 2015, 3 pages.

Huai et al., "Observation of spin-transfer switching in deep submicron-sized and low-resistance magnetic tunnel junctions," Applied physics letters, vol. 84, No. 16, 2004, pp. 3118-3120.

Intel, "Software Guard Extensions Programming Reference", Sep. 2013, 156 pages.

International Search Report and Written Opinion received for PCT Patent Application No. PCT/US2015/053308, dated Jun. 30, 2016, 7 pages.

Jiang et al., "Architecture support for improving bulk memory copying and initialization performance", In Proceedings of the 2009 18th International Conference on Parallel Architectures and Compilation Techniques, PACT '09, 2009, pp. 169-180.

Lewis et al., "Avoiding initialization misses to the heap" In Computer Architecture, 2002. Proceedings. 29th Annual International Symposium on Computer architecture, pp. 183-194, 2002.

Li et., "Exploring high-performance and energy proportional interface for phase change memory systems", 2013 IEEE 19th International Symposium on High Performance Computer Architecture (HPCA), 2013.

Liu et al., "NVM Duet: Unified working memory and persistent store architecture", ASPLOS '14, pp. 1-34.

Matthew Dillon, "Pre-Faulting and Zeroing Optimizations", Design elements of the FreeBSD VM system, Nov. 13, 2013, 2 pages.

Moraru et al., Persistent, Protected and cached: Building blocks for main memory data stores. Work, 2012, 28 pages.

(56) References Cited

OTHER PUBLICATIONS

Muralimanohar et al., "Cacti 6.0: A tool to model large caches", HP Laboratories, vol. 27, 2009, 24 pages.

Nair et al., "Archshield: Architectural framework for assisting dram scaling by tolerating high error rates," In Proceedings of the 40th Annual International Symposium on Computer Architecture, ISCA '13, 2013, pp. 72-83.

Novark et al., "Automatically correcting memory errors with high probability", In Proceedings of the 2007 ACM SIGPLAN Conference on Programming Language Design and Implementation, ACM. Press, 2007, 11 pages.

Qureshi et al., "Enhancing lifetime and security of pcm-based main memory with start-gap wear leveling", In Microarchitecture, 2009. MICRO-42. 42nd Annual IEEE/ACM International Symposium on Microarchitecture, pp. 14-23, Dec. 2009.

Rogers et al., "Using address independent seed encryption and bonsai merkle trees to make secure processors os-and performance-friendly", In Proceedings of the 40th Annual IEEE/ACM International Symposium on Microarchitecture, MICRO 40, 2007, pp. 183-196.

Russinovich et al., "Windows Internals: Including Windows Server 2008 and Windows Vista, Fifth Edition," Microsoft Press, 5th edition, 2009, , 1263 pages.

Sartor et al., "Cooperative cache scrubbing", In Proceedings of the 23rd international conference on Parallel architectures and compilation, pp. 15-26. ACM, 2014.

Seshadri et al., "Rowclone: Fast and energy-efficient in-dram bulk data copy and initialization", In Proceedings of the 46th Annual IEEE/ACM International Symposium on Microarchitecture, MICRO-46, 2013, pp. 185-197.

Valat et al., "Introducing kernel-level page reuse for high performance computing", In Proceedings of the ACM SIGPLAN Workshop on Memory Systems Performance and Correctness, Article No. 3, ACM, 2013, 9 pages.

William Stallings, Cryptography and Network Security (6th ed.), 2014, 758 pages.

Yan et al, "Improving cost, performance, and security of memory encryption and authentication", Appears in the Proceedings of the 33rd International Symposium on Computer Architecture (ISCA-33), Jun. 2006, pp. 179-190.

Yang et al., "Memristive devices for computing", Nature nanotechnology, vol. 8, No. 1, 2013, pp. 13-24.

Yang et al., "Why nothing matters: The impact of zeroing", In Proceedings of the 2011 ACM International Conference on Object Oriented Programming Systems Languages and Applications, OOPSLA '11, 2011, pp. 307-324.

Young et al., "Deuce: Write-efficient encryption for non-volatile memories", In Proceedings of the Twentieth International Conference on Architectural Support for Programming Languages and Operating Systems, ASPLOS '15, 2015, pp. 33-44.

Zhou et al., "A durable and energy efficient main memory using phase change memory technology", In ISCA '09: Proceedings of the 36th annual international symposium on Computer architecture, 2009, pp. 14-23.

\* cited by examiner

USING A MEMORY CONTROLLER TO MANGE ACCESS TO A MEMORY BASED ON A MEMORY INITIALIZATION STATE INDICATOR

BACKGROUND

For purposes of analyzing relatively large data sets (often called "big data"), computer systems have ever-increasingly large main memories. One type of memory is a volatile memory, such as a Dynamic Random Access Memory (DRAM). A volatile memory loses its content in the event of a power loss. Moreover, the memory cells of certain volatile memories, such as the DRAM, are frequently refreshed to avoid data loss. Another type of memory is a non-volatile memory (NVM), which retains its data in the event of a power loss. The memory cells of an NVM retain their stored data without being refreshed.

DETAILED DESCRIPTION

Figure 1:
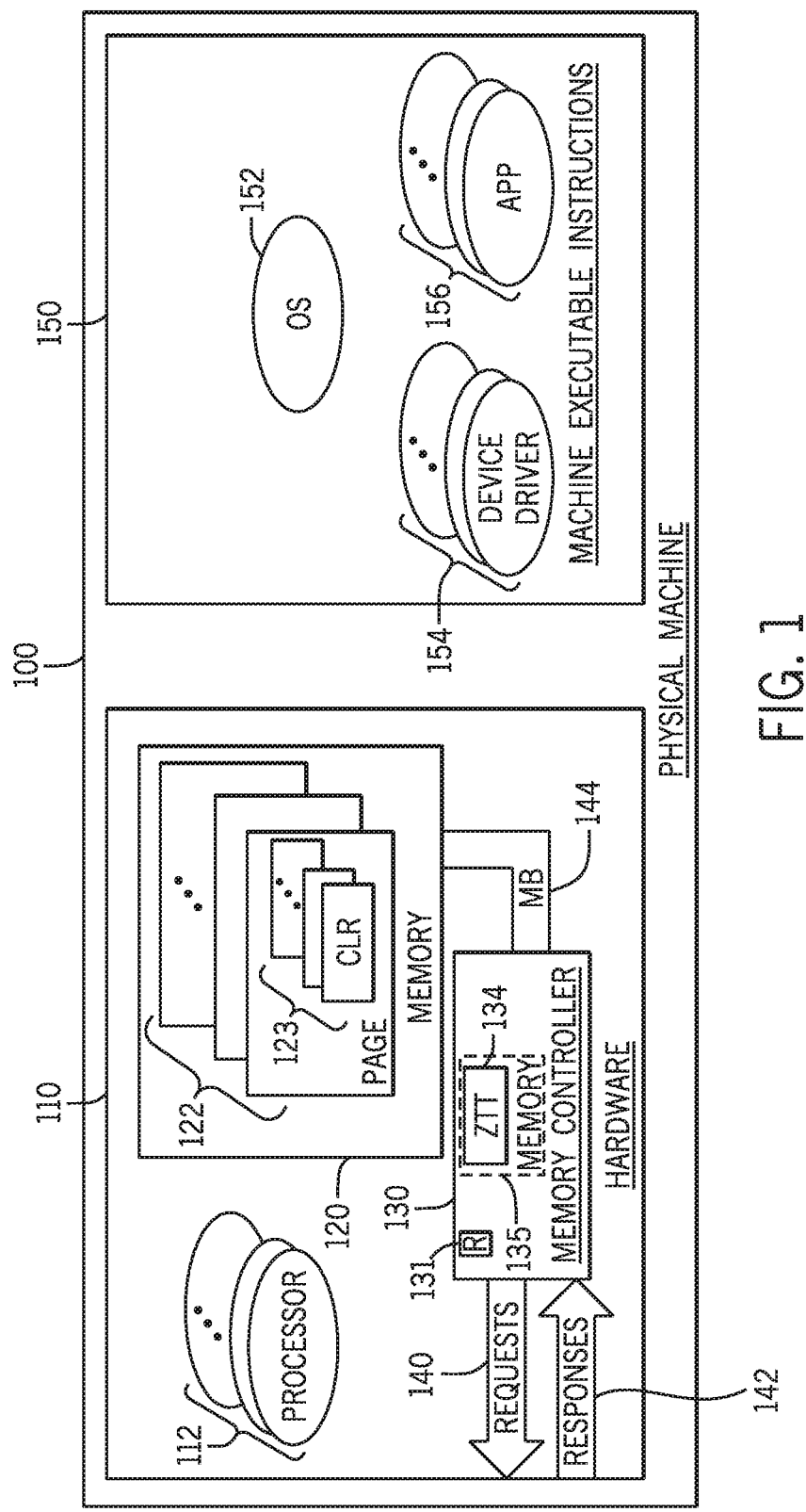
FIG. 1 is a schematic diagram of a physical machine according to an example implementation.

A computer system may employ measures to protect data associated with applications executing on the system from being exposed to internal or external adversaries. One approach to protect data from one application from being visible to another application includes clearing, or "zeroing," units of memory (pages of memory, for example) before the units are allocated to a new application. In this manner, the computer system may zero a given memory unit by writing zeros to all of the addressable locations of the unit. Due to the zeroing, the newly-allocated units of memory do not contain data traces left behind by other applications to which the units were previously allocated.

Non-Volatile Memories (NVMs) are ever-increasingly being used as replacements for volatile memories. As examples, NVMs include flash memories, memristors, phase change memories, ferroelectric random access memories (F-RAMs) and magnetoresistive random access memories (MRAMs), to name a few. In general, an NVM may have advantages over a volatile memory. For example, the NVM may be more scalable, as compared to a volatile memory, thereby providing a higher storage density. Other advantages may be that NVM cells are not refreshed (thereby not consuming refresh power); the NVM does not lose its content upon power loss; and the NVM allows for the potential of persistent data.

A potential challenge, however, with using zeroing to protect application data in an NVM-based computer system is that the NVM may have a relatively large write latency (i.e., an NVM device may take a relatively longer time to store data, as compared to a volatile memory device). Therefore, for example, zeroing an NVM page may consume more time than zeroing a page of volatile memory. Another potential challenge in zeroing NVM is that an NVM cell may be written a finite number of times before the cell is no longer usable. Therefore, the above-described zeroing approach may potentially impact the lifetime of the NVM.

Example implementations are disclosed herein in which a region of memory, such as a page, may be effectively zeroed without actually writing zeros to the memory. More specifically, in accordance with example implementations, a computer system includes a memory controller that manages access to a memory of the system based on initialization state indicators that are stored in a table of the memory controller. Using this approach, the memory controller may effectively initialize a region of the memory by updating the corresponding indicator(s) in the local table, instead of by, for example, writing zeros to the region.

More specifically, in accordance with example implementations, the memory controller maintains and uses a Zero Tracking Table (ZTT) for purposes of tracking regions of the memory that are zeroed. In accordance with example implementations, the computer system may use the ZTT to track and manage the zeroed status of regions of the memory, which correspond to cache line-aligned memory boundaries (called "cache line regions" herein). As described herein, the memory controller may also use the ZTT to zero out a page of memory (containing multiple cache line regions), without actually writing zeros or any other data to the memory. In this manner, instead of accessing the memory to zero out a page, the memory controller updates the ZTT so that the ZTT stores data that represents that the cache lines of the page have been zeroed.

Moreover, in accordance with example implementations, when a requestor submits a read request to read data from a cache line region, which the ZTT indicates is zeroed, the memory controller furnishes a cache line-sized block of zeros to the requestor, without actually accessing the memory. When a requestor writes to a zeroed cache line, the memory controller updates the ZTT so that the ZTT stores data that represents that the cache line region is no longer zeroed. It is noted that the written cache line might have the value of zero, but, in accordance with example implementations, the cache line is still marked in the ZTT table as being no longer zero.

As a more specific example, FIG. 1 depicts a physical machine 100, in accordance with some implementations. The physical machine 100 is an actual machine, which includes actual hardware 110 and actual machine executable instructions 150, or "software." The physical machine 100 may include such hardware 110 as one or multiple processors 112 (one or multiple Central Processing Unit (CPU) cores, for example); a memory 120; and a memory controller 130. In accordance with example implementations, the memory 120 may be an NVM, although the memory 120 may be a volatile memory, in accordance with further example implementations. In accordance with example implementations, the machine executable instructions 150 includes instructions that when executed by one or multiple processors 112 form an operating system 152, one or multiple device drivers 154, one or multiple applications, 156, and so forth.

As depicted in FIG. 1, the memory 120 contains regions referred to as "pages 123" herein. In accordance with example implementations, the page 123 represents memory locations in the memory 120, which are part of a corresponding virtual memory page, which is the smallest unit of virtual memory that is tracked by a physical-to-virtual address mapping page table of the physical machine 100. Moreover, in accordance with example implementations, each page 123 contains cache line regions 123. A cache line region 123 corresponds to a set of contiguous physical memory addresses that are aligned with a cache line boundary. It is noted that although the physical memory addresses of the cache line region 123 are contiguous, the cache line regions 123 for a given page 123 may be stored in multiple, non-contiguous physical addresses of the memory 120.

The memory controller 130 controls the flow of data into and out of the memory 120 in response to requests 140 (read requests, write requests, zero page requests, and so forth) that are provided by requestors of the physical machine 100. As an example, a requestor may be a processor 112 that executes instructions associated with the operating system 152 to cause the processor 112 to submit a read, write or zero request 140. A requestor may also be an entity other than a processor 112, such as a direct memory access (DMA) controller, a graphics controller, and so forth.

In general, the memory controller 130 may receive the requests 140 through signaling that occurs over one or multiple communication links of the physical machine 100, such as a communication link to one or multiple processors, a Peripheral Component Interconnect (PCI)-Express bus, a Direct Media Interface, and so forth. The memory controller 130 may communicate responses 142 to the requests 140 over the same communication links.

For a request 140 that involves writing data in or reading data from the memory 120, the memory controller 130 provides signals to a memory bus 144 that is coupled to the memory 120. For example, to write data to the memory 120, the memory controller 130 provides control signals that identify the bus operation as being a write operation, address signals that represent an address of the memory 120 in which the data is to be stored and data signals that represent the data. The memory 120 responds by storing the data in the memory cells associated with the address.

To read data from the memory 120, the memory controller 130 provides control signals to the memory bus 144, such as signals that identify the bus operation as being a read operation and address signals that represent a physical address of the memory 120 from which the data is to retrieved. The memory 120 responds by providing data signals to the memory bus 144, which represent the data stored in the memory cells associated with the address.

In accordance with example implementations, the memory controller 130 may be an integrated circuit (IC). Moreover, in accordance with example implementations, the memory controller 130 may be part of an IC contains a bridge (a north bridge, for example) that is separate from the processors 120. In accordance with further example implementations, the memory controller 130 may be part of a CPU semiconductor package that contains one or multiple processors 112.

In accordance with some implementations, the memory controller 130 has access to a local memory 135 that stores a Zero Tracking Table (ZTT) 134, which stores data that represents which cache line regions 123 and which pages 122 of the memory 120 are to be treated as being zeroed. Depending on the particular implementation, the local memory 135 may be a volatile memory or a non-volatile memory; and in accordance with some implementations, the local memory 135 may be part of an IC that also contains the memory controller 130.

Figure 2A:
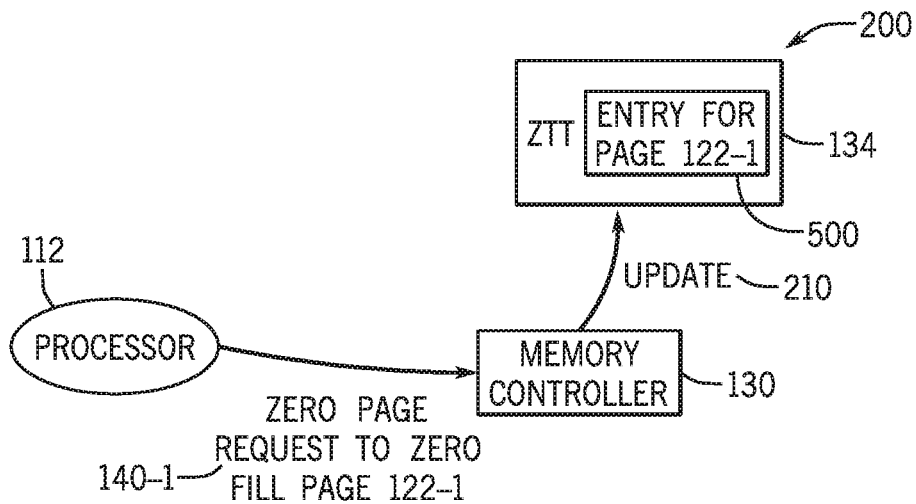
FIG. 2A illustrates a scenario in which a memory controller of the physical machine FIG. 1 receives a zero page request and updates a Zero Tracking Table (ZTT) according to an example implementation.

FIG. 2A depicts an example scenario 200 in which the memory controller 130 responds to a zero page request 140-1 without actually writing any zeros or other data to the memory 120. Referring to FIG. 2A in conjunction with FIG. 1, a requestor, may generate the zero page request 140-1 for purposes of zeroing out, (i.e., zero filling or writing all zeros) a page 122-1 of the memory 120.

As a more specific example, in accordance with example implementations, to generate the zero page request 140-1, one or multiple processors 112 may execute machine executable instructions that cause a user level process to pass a virtual address to a kernel of the operating system 152 using a system call; and in response to the system call, the operating system kernel may write the physical address of the page to be zeroed to a memory-mapped input/output (I/O) register 131 of the memory controller 130. It is noted that such a mechanism may be used, in lieu of having applications directly write to the register 131, as such application access may introduce a security vulnerability.

The zero page request 140-1 may be generated by a requestor other than a requestor associated with a processor 112, and the zero page request 140-1 may be generated by executing instructions other than instructions associated with an operating system, in accordance with further example implementations.

In response to the zero page request 140-1, the memory controller 130 updates the ZTT 134, as indicated at reference numeral 210 in FIG. 2A. The update modifies an entry 500 of the ZTT 134, which serves as an indicator to indicate whether the page 122-1 is to be treated as being zeroed. Therefore, for example scenario 200, the memory controller 130 updates the ZTT 134 so that the entry 500 that corresponds to the page 122-1 is modified to represent that the page 122-1 has been zeroed. It is noted that in processing the zero page request 140-1, the memory controller 130 does not actually access the memory 120 to write zeros or any other data to the memory 120.

For a subsequent read request that targets a cache line region 123 of the zeroed page 122-1, the memory controller 130 selectively accesses the memory 120, based on whether the ZTT 134 indicates whether the cache line region 123 has been written after being zeroed. In this manner, in accordance with example implementations, the memory controller 130 updates the ZTT 134 when a write occurs to a zeroed cache line region 123 for purposes of changing the corresponding indicator of the ZTT 134 to reflect that the region 123 should no longer be treated as being zeroed (although the write may be a write of all zeroes to the cache line region 123).

Figure 2B:
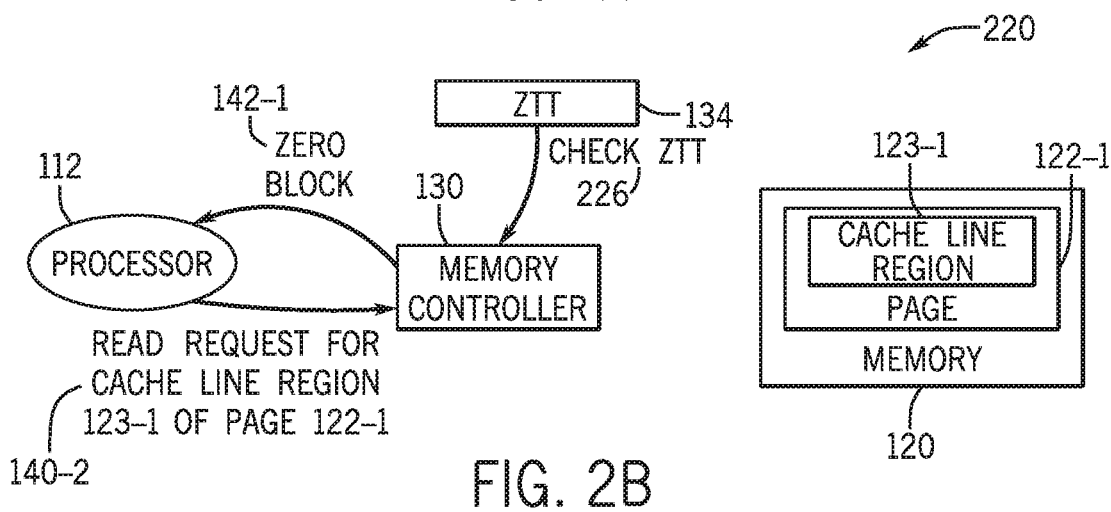
FIG. 2B illustrates a scenario in which a memory controller responds to a read request for data corresponding to a cache line region that is zeroed according to an example implementation.
Figure 2C:
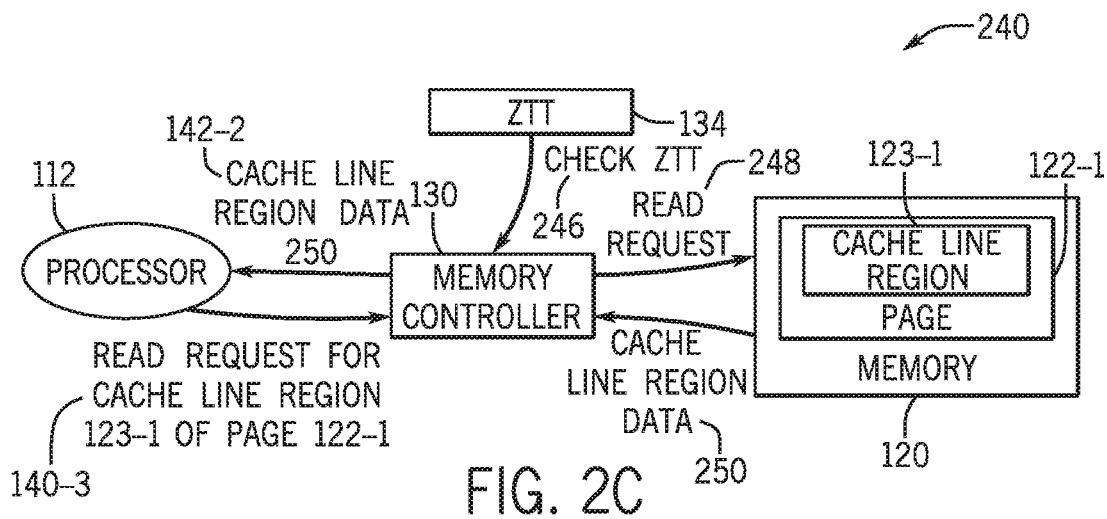
FIG. 2C illustrates a scenario in which a memory controller responds to a read request for data corresponding to a cache line region that is not zeroed according to an example implementation.

More specifically, FIG. 2B depicts an example scenario 220 in which the memory controller 130 responds to a read request 140-2 that is directed to a cache line 123-1 of the page 122-1, which remains zeroed after the zeroing of the page 122-1; and FIG. 2C depicts an example scenario 240 in which the memory controller 130 responds to a read request 140-3 that is directed to the cache line region 123-1, which has been written after the zeroing of the page 122-1.

Referring to FIG. 2B in conjunction with FIG. 1, the processor 112 for scenario 220 submits the read request 140-2 that targets the cache line region 123-1, and the memory controller 130 checks 226 the ZTT 134 to determine whether the ZTT 134 stores data that represents whether the cache line region 123-1 is zeroed. Because for scenario 220, the cache line region 123-1 has not been written (as represented by ZTT 134), the memory controller 134 does not request the data from the memory 120. Rather, the memory controller 130 responds, as indicated at reference numeral 142-1, by providing a zero block of data, which corresponds to a cache line of zeros, to the requestor (here, the processor 112).

Referring to FIG. 2C in conjunction with FIG. 1, for the scenario 240 in which the read request 140-3 targets the cache line region 123-1 that has been written after being zeroed, the memory controller 130 first identifies the non-zeroed status of the cache line 123-1 from the ZTT 134, as depicted at reference numeral 246. The memory controller 130 then generates a read request 248 to the memory 120 to read the data for the cache line region 123-1 from the memory 120. In this manner, the memory controller 130 may, for example, provide signals to the memory bus 144 (FIG. 1) for purposes of causing the memory 120 to furnish data 250 corresponding to the region 123-1 to the memory controller 130. The memory controller 130 then provides the data 250 read from the memory 120 to the requestor (here, the processor 112), as depicted at reference numeral 142-2.

Figure 2D:
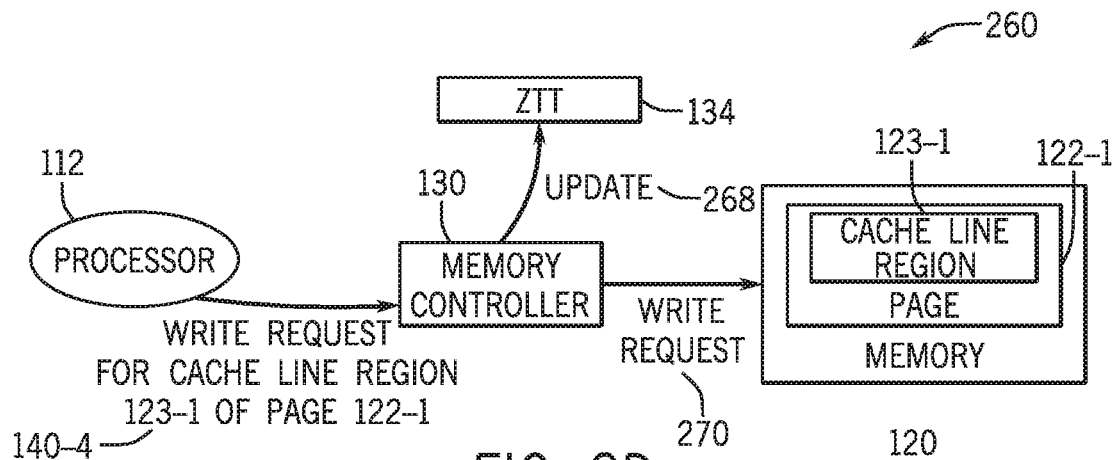
FIG. 2D illustrates a scenario in which a memory controller responds to a write request according to an example implementation.

FIG. 2D depicts an example scenario 260 in which a write occurs to the cache line region 123-1 of a page 122-1 that has been zeroed. In response to the write request 140-4, the memory controller 130 updates 268 the ZTT 134 (assuming that the write is the first write to the cache line region 123-1 after being zeroed) so that the ZTT 134 stores data that represents that the cache line region 123-1 no longer contains zero data. The memory controller 130 then provides a write request 270 to the memory 120 for purposes of writing the new data to the cache line region 123-1.

In accordance with further example implementations, a page may be initialized before being allocated to an application with a predetermined data pattern other than a pattern of all zeros (a pattern of all ones, a certain predetermined pattern of ones and zeros, and so forth). Moreover, in accordance with further example implementations, the memory controller may initialize regions of the memory other than pages (units of multiple pages, for example). In accordance with further example implementations, the memory controller may track regions of the memory other than cache line boundary-aligned regions.

Figure 3:
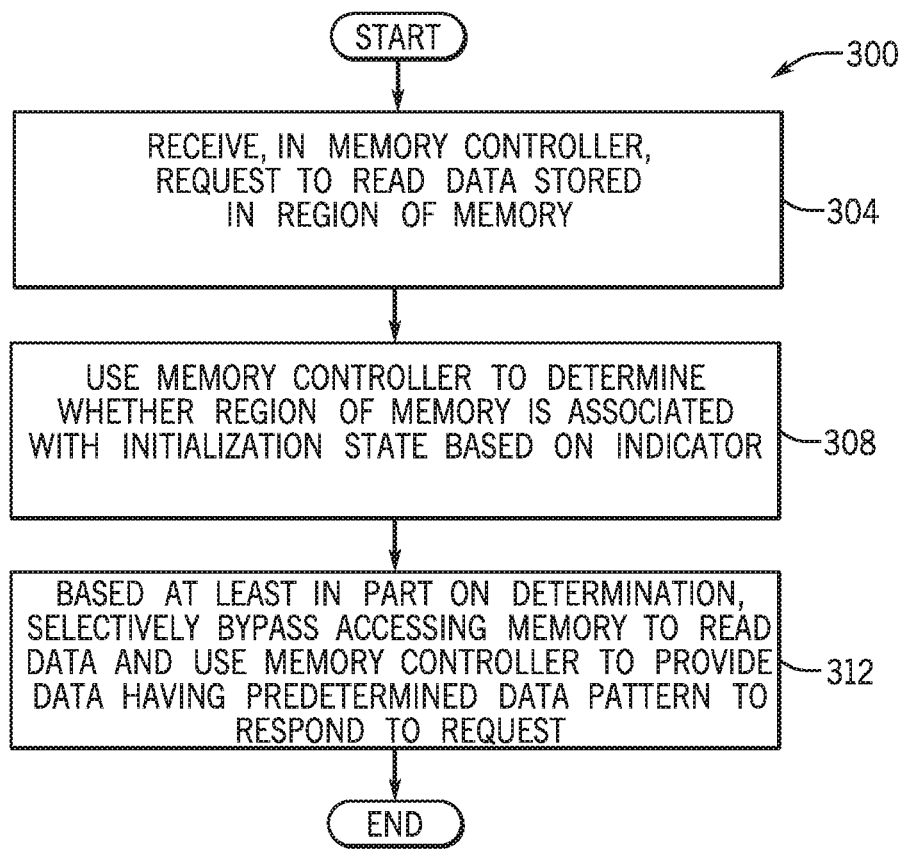
FIGS. 3 and 4 are flow diagrams depicting techniques to use a memory controller to manage access to a region of memory based on a memory initialization state indicator according to example implementations.

Thus, referring to FIG. 3, in accordance with example implementations, a technique 300 generally includes receiving (block 304), in a memory controller, a request to read data that is stored in a region of memory; and using a memory controller to manage access to the memory based at least in part an initialization state indicator for the memory region. Using the memory controller to manage the memory access includes determining (block 308) whether the region of memory is associated with the initialization state based on the indicator and based at least in part on the determination, selectively bypassing accessing the memory and using the memory controller to provide data having a predetermined data pattern, as depicted in block 312.

Figure 4:
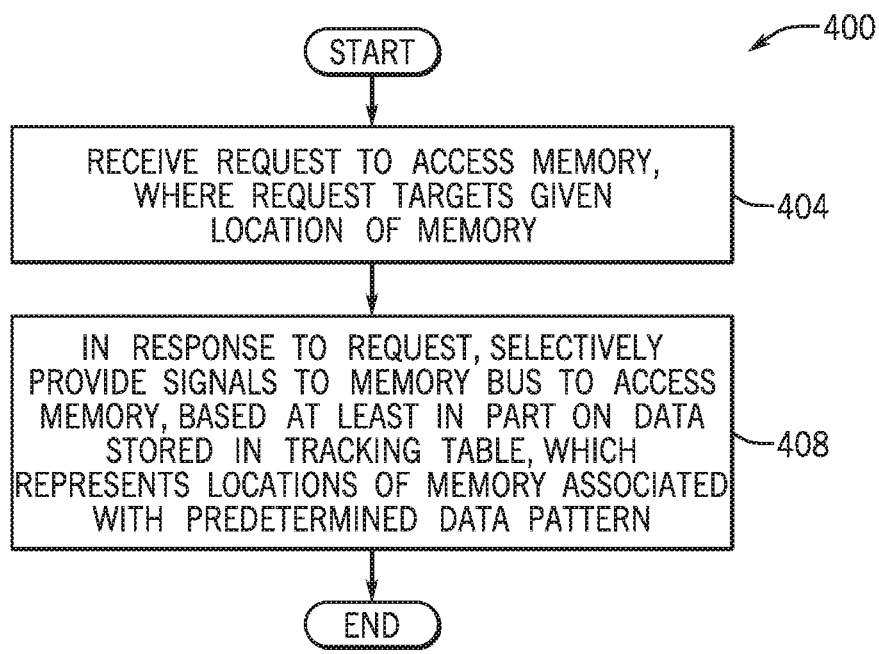

Referring to FIG. 4, in accordance with example implementations, the memory controller 130 may perform a technique 400, which includes receiving (block 404) a request to access a given location of a memory. The technique 400 includes, in response to the request, selectively providing (block 408) signals to a memory bus to access the memory, based at least in part on data stored in a tracking table, which represents locations of the memory associated with a predetermined data pattern.

Figure 5A:
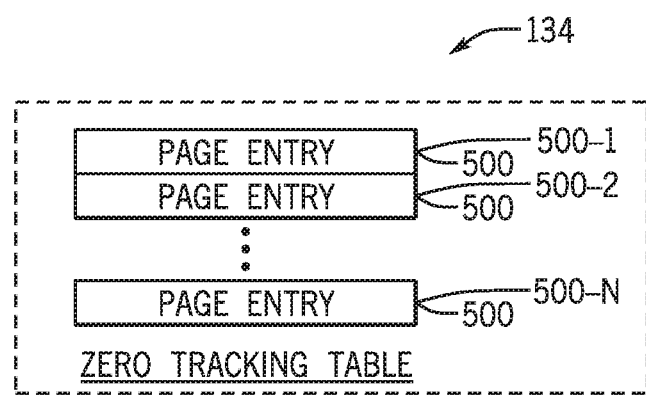
FIG. 5A illustrates an organization of the ZTT according to an example implementation.

Referring to FIG. 5A, in accordance with example implementations, the ZTT 134 includes N entries 500 (entries 500-1, 500-2 . . . 500-N, via depicted as examples in FIG. 5A), which correspond to N pages 122 of the memory 120. Each entry 500, in turn, in accordance with example implementations, contains data representing the initialized status (zeroed status, for example) of a corresponding page 122 of the memory 120. In this manner, in accordance with example implementations, each entry 500 may be associated with a particular page address. Moreover, referring to FIG. 5B in conjunction with FIG. 5A, in accordance with some implementations, each entry 500 may include a set of cache line bit indicators 510 (P cache line bit indicators 510-1, 510-2 . . . 510-P, being depicted as examples in FIG. 5B), where each cache line bit indicator 510 may be as a bit that represents the zeroed status of an associated cache line region 123 of the page 122. For example, a logic zero for the bit may represent a zeroed status for an associated cache line region 123, and a logic one for the bit may represent that the cache line region 123 is not zeroed.

Thus, in accordance with example implementations, in response to receiving a zero page request, the memory controller 133 may update the corresponding entry 500 of the ZTT 134 to clear all of the cache line bit indicators 510 to represent that all of the cache line regions 123 of the page 122 have been zeroed. As writes occur to a given page, the memory controller 130 may, in accordance with example implementations, update the corresponding cache line bit indicators 510 to set the corporate indicators 510 (i.e., store corresponding one bits in the indicators 510) to indicate that the cache line regions 123 are no longer zeroed. Therefore, in accordance with example implementations, the page entry 500 serve as an indicator to indicate or represent whether an associated page is zeroed or not; and the bit indicator 510 serves as an indicator to indicate or represent whether an associated cache line region is zeroed or not.

Figure 5B:
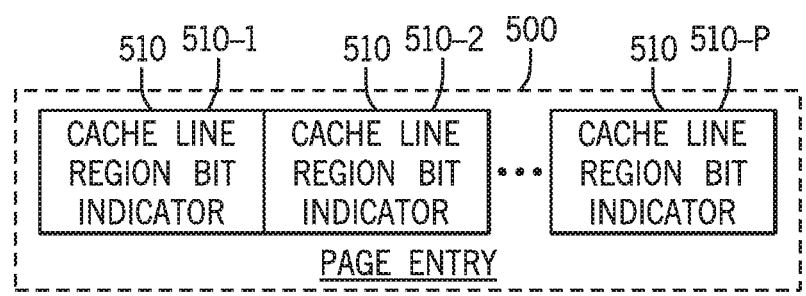
FIG. 5B illustrates the organization of a page entry of the ZTT according to an example implementation.

The ZTT 134 may have a different format and may contain data arranged in a different fashion than that depicted in FIGS. 5A and 5B, in accordance with further implementations.

In accordance with some implementations, the memory controller 130 invalidates zeroed cache line memory regions. For example, in accordance with some implementations, a zero page request may be followed with the execution of PCOMMIT and SFENCE instructions. It is assumed for this approach that the address range of the register 131 (FIG. 1) is declared as persistent, and the memory controller 130 marks the zero page request write as being flushed when all of the invalidations have been posted. In accordance with further example implementations, the memory controller 130 may loop to continuously read the register 131 until the register 131 returns the value of zero. The memory controller 130 may then set the value stored in the register 131 to zero after sending out all of the invalidations. Such a waiting loop does not generate any traffic on the memory bus 144.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving, in a memory controller, a request to read data stored in a given subregion of a plurality of subregions of a memory;
   using the memory controller to manage access to the memory based on an initialization state indicator for the given subregion of memory, wherein managing access comprises:
   determining whether the given subregion of memory is associated with an initialization state based on the initialization state indicator; and
   based at least in part on the determination, selectively bypassing accessing the memory and using the memory controller to provide data having a predetermined data pattern;
   using the memory controller to maintain a table containing entries, wherein each entry of the entries is associated with a subregion of the plurality of subregions and represents that the associated subregion is associated with the initialization state; and
   selectively updating the table to represent that the given subregion is associated with the initialization state in response to an address of the given subregion being communicated to the memory controller.

2. The method of claim 1, wherein determining whether the given subregion of memory is associated with the initialization state comprises indexing the table based on a cache line and a page associated with the request to read data to retrieve an indicator representing whether the given subregion of memory is associated with the initialization state.

3. The method of claim 1, wherein selectively bypassing accessing the memory comprises selectively providing signals to a memory bus to read the data stored in the given subregion of memory.

4. The method of claim 1, further comprising:
   selectively updating the table in response to a write request.

5. An apparatus comprising:
   a tracking table to store data representing locations of a memory associated with an initialized data pattern entries, wherein each entry of the entries is associated with a location of a plurality of locations of a memory and represents that the associated location is associated with an initialized data pattern; and
   a controller to:
   receive a request to access the memory, the request to access the memory targeting a given location of the plurality of locations of the memory;
   in response to the request, selectively provide signals to a memory bus to access the memory, based at least in part on the data stored in the tracking table; and
   selectively update the tracking table to represent that the given location is associated with the initialized data pattern an initialization state in response to an address of the given location being communicated to a memory controller.

6. The apparatus of claim 5, wherein the request to access the memory comprises a read request, and the controller provides the signals to the memory bus to access the memory in response to the given location being a location other than one of the locations represented by the data stored in the tracking table.

7. The apparatus of claim 5, wherein:
   the request to access the memory comprises a write request;
   the given location is one of the locations associated with the entries represented by the data stored in the tracking table; and
   the controller updates the data stored in the tracking table to cause the data to represent that the given location is not associated with the initialized data pattern.

8. The apparatus of claim 7, wherein the controller further provides signals to the memory bus to write data associated with the write request to the given location of the memory.

9. The apparatus of claim 7, wherein the initialized data pattern comprises a pattern of zeros.

10. A system comprising:
    a memory comprising a plurality of pages and first pages of the plurality of pages being associated with zero fill page requests;
    a processor to provide a request to read data from the memory, the request being associated with a given page of the first pages; and
    a memory controller to:
    access a table storing entries, wherein each first page comprises a plurality of cache line regions, and each entry of the table is associated with a first page of the first pages and represents states of the cache line regions of the associated first page;
    manage the request to read data from the memory based at least in part on the entry associated with the given page; and
    selectively update the table to represent that a given page of the plurality of pages to represent that the given page is associated with an initialization state in response to an address of the given page being communicated to the memory controller.

11. The system of claim 10, wherein the states of the cache line regions comprise states representing whether the cache line regions have zeroed contents.

12. The system of claim 11, wherein:
    the processor further provides a request to write data to a first page of the plurality of first pages; and
    the memory controller updates the table in response to the request to write data.

13. The system of claim 10, further comprising:
    an integrated circuit; and
    another memory to store the table,
    wherein the memory controller and the another memory are part of the integrated circuit.

14. The system of claim 10, wherein the memory controller updates the table in response to receiving a request to zero fill a page of the memory.

15. The method of claim 1, further comprising initiating, using a user level process, a zero page request to initialize the given subregion, and writing the address of the given subregion to the memory controller in response to the initiation of the zero page request.

16. The method of claim 15, wherein using the user level process to initiate the zero page request comprises using the user level process to pass a virtual address to a kernel of an operating system.

17. The method of claim 15, wherein writing the address of the given subregion to the memory controller comprises an operating system writing to a register of the memory controller.

* * * * *